United States Patent
Price

(10) Patent No.: US 12,545,326 B2
(45) Date of Patent: Feb. 10, 2026

(54) PROTECTIVE ENCLOSURE AND METHOD OF USING

(71) Applicant: Harry Price, Park City, UT (US)

(72) Inventor: Harry Price, Park City, UT (US)

(*) Notice: Subject to any disclaimer, the term of this patent is extended or adjusted under 35 U.S.C. 154(b) by 462 days.

(21) Appl. No.: 18/306,645

(22) Filed: Apr. 25, 2023

(65) Prior Publication Data

US 2023/0382170 A1  Nov. 30, 2023

Related U.S. Application Data

(60) Provisional application No. 63/336,604, filed on Apr. 29, 2022.

(51) Int. Cl.
| | |
|---|---|
| *B62D 21/14* | (2006.01) |
| *B60J 11/10* | (2006.01) |
| *B62D 25/18* | (2006.01) |
| *B62D 33/027* | (2006.01) |
| *E04H 15/08* | (2006.01) |

(52) U.S. Cl.
CPC .............. *B62D 21/14* (2013.01); *B60J 11/10* (2013.01); *B62D 25/184* (2013.01); *B62D 33/027* (2013.01); *E04H 15/08* (2013.01)

(58) Field of Classification Search
CPC .... B62D 25/16; B62D 25/182; B62D 25/184; B62D 25/186; B62D 25/2054; B62D 33/027; B62D 21/14; B62D 35/001; E04H 15/06
USPC ............ 296/26.13, 26.12, 163, 184.1, 180.4, 296/180.2, 171; 135/88.11, 88.12
See application file for complete search history.

(56) References Cited

U.S. PATENT DOCUMENTS

| | | | |
|---|---|---|---|
| 1,752,571 A | 4/1930 | Olson | |
| 2,870,774 A | 1/1959 | Denzil | |
| 2,989,967 A | 6/1961 | Lee | |
| 3,292,971 A | 12/1966 | Zucker | |
| 3,800,484 A | 4/1974 | Marshall | |
| 3,870,061 A | 3/1975 | Lowery | |
| 4,010,973 A | 3/1977 | Heinrich | |
| 4,601,509 A * | 7/1986 | Ellis, Sr. ............... | B60P 3/0257 296/22 |
| 4,883,306 A | 11/1989 | Stucky | |
| 5,026,243 A | 6/1991 | Dell | |

(Continued)

FOREIGN PATENT DOCUMENTS

| | | |
|---|---|---|
| EP | 3018000 A2 | 5/2016 |
| TW | M563362 U | 7/2018 |

*Primary Examiner* — Amy R Weisberg
*Assistant Examiner* — Denise L Esquivel
(74) *Attorney, Agent, or Firm* — Wood Herron & Evans LLP

(57) ABSTRACT

A trailer for use with a truck having at least one drive wheel is disclosed. The trailer includes a floor configured to carry cargo and a protective enclosure moveable between a stowed position and a deployed position. The protective enclosure has a frame and a top panel, a first side panel, a second side panel, and an end panel that are attachable to the frame. In the stowed position, the protective enclosure is positioned adjacent the floor. In the deployed position, the protective enclosure projects away from the floor and the top panel, the first side panel, the second side panel, and the end panel cooperate to form an interior space shielded from inclement weather. A method of servicing at least one drive wheel of a truck coupled to a trailer is also disclosed.

21 Claims, 4 Drawing Sheets

(56) References Cited

U.S. PATENT DOCUMENTS

| | | | |
|---|---|---|---|
| 5,170,811 A * | 12/1992 | Kirk | E04H 15/08 |
| | | | 135/88.13 |
| 5,277,214 A | 1/1994 | Tolley | |
| 5,997,073 A | 12/1999 | Vanderhoof | |
| 6,260,909 B1 | 7/2001 | Crean et al. | |
| 7,093,888 B2 | 8/2006 | Anderson et al. | |
| 7,328,935 B1 * | 2/2008 | Tarin | E04H 15/06 |
| | | | 160/72 |
| D622,413 S | 8/2010 | Cropley | |
| 8,616,721 B1 * | 12/2013 | Woodall, Jr. | E04H 15/08 |
| | | | 362/543 |
| 9,526,319 B2 | 12/2016 | Jungling | |
| 9,630,547 B2 | 4/2017 | Adams et al. | |
| 2013/0105054 A1 * | 5/2013 | Stewart | B60C 27/06 |
| | | | 152/213 A |
| 2018/0244141 A1 * | 8/2018 | Mathiasen | B60J 11/10 |
| 2023/0358070 A1 * | 11/2023 | Cheplic | E04H 15/08 |

\* cited by examiner

PROTECTIVE ENCLOSURE AND METHOD OF USING

CROSS-REFERENCE TO RELATED APPLICATIONS

This application claims the benefit of priority to U.S. Provisional Patent Application Ser. No. 63/336,604 filed Apr. 29, 2022, the disclosure of which is incorporated by reference herein.

TECHNICAL FIELD

The invention relates generally to a protective enclosure and, more particularly, to a protective enclosure used in conjunction with semi-trailers.

BACKGROUND

A semi-trailer truck, also known as a tractor trailer, is a combination of a tractor coupled to one or more semi-trailers. Freight is loaded into and transported by the semi-trailer, which is pulled by the tractor. Typically the semi-trailer will have a king pin that engages a fifth wheel positioned above the drive wheels of the tractor. As such, a portion of the weight of the semi-trailer and its freight are carried by the drive wheels of the tractor and the remaining portions are carried by the rear wheels at the back of the semi-trailer.

During wintry weather, the driver of the semi-trailer truck will often have to drive on roads covered in snow and ice, including roads with uphill and downhill grades. To assist the semi-trailer truck in traversing roads covered in snow and ice, the driver may choose to attach tire chains to the drive wheels of the tractor. Often the driver is forced to attach the tire chains during adverse weather conditions such as high wind, snow, sleet, rain, and the like. As such, the process of attaching the tire chains to the drive wheels may be challenging and messy. What is needed, therefore, is an apparatus to protect the driver from adverse weather while attaching tire chains to the drive wheels.

SUMMARY OF THE INVENTION

To these and other ends, a trailer for use with a truck having at least one drive wheel is disclosed. In one embodiment, the trailer includes a floor configured to carry cargo and a protective enclosure moveable between a stowed position and a deployed position. The protective enclosure has a frame defining a periphery; a support for supporting an end of the frame; a top panel attachable to the periphery of the frame; and a first side panel, a second side panel, and an end panel attachable to the frame. In the stowed position, the protective enclosure is positioned adjacent the floor. In the deployed position, the protective enclosure projects away from the floor and the top panel, the first side panel, the second side panel, and the end panel cooperate to form an interior space shielded from inclement weather.

In one aspect, in the deployed position, the protective enclosure may be positioned at a front section of the trailer such that when the truck is coupled to the trailer, the interior space at least partially shields the at least one drive wheel.

In one aspect, the support may include a pair of legs coupled to the frame to support the end of the frame when the protective enclosure is in the deployed position.

In one aspect, the trailer may further include a storage chamber positioned adjacent the floor. Thus, in the stowed position, the protective enclosure may be positioned inside the storage chamber and in the deployed position, the protective enclosure may be at least partially outside the storage chamber. The storage chamber may be positioned at a front section of the trailer such that when the truck is coupled to the trailer and the protective enclosure is in the deployed position, the interior space at least partially shields the at least one drive wheel.

In one aspect, the protective enclosure may include a handle attached to the frame to assist with moving the protective enclosure between the stowed position and the deployed position.

In one aspect, the storage chamber may include a first opening located on a first side of the trailer and a first moveable door to cover the first opening when the protective enclosure is in at least the stowed position. The first opening is configured to allow the protective enclosure to move therethrough between the stowed position and the deployed position. The storage chamber may further include a second opening located on a second, opposing side of the trailer and a second moveable door to cover the second opening when the protective enclosure is in at least the stowed position. The second opening is configured to allow the protective enclosure to move therethrough between the stowed position and the deployed position.

In one aspect, at least one wheel may be coupled to the protective enclosure to assist with moving the protective enclosure in and out of the storage chamber between stowed and deployed positions.

In one aspect, the protective enclosure may include at least one light configured to illuminate the interior space when the protective enclosure is in the deployed position.

In another embodiment, a method of servicing at least one drive wheel of a truck coupled to a trailer includes providing a truck having at least one drive wheel and a trailer coupled to the truck having a floor configured to carry cargo; providing a protective enclosure in a stowed position adjacent to the trailer; moving the protective enclosure from the stowed position to a deployed position; and covering a frame of the protective enclosure with one or more panels to form an interior space at least partially shielding the at least one drive wheel.

The protective enclosure used in the method includes at least some of the features of the protective enclosure described above. For example, the protective enclosure may be positioned at a front section of the trailer. The protective enclosure may include at least one leg coupled to the frame to support an end of the frame when the protective enclosure is in the deployed position.

In one aspect of the method, the trailer may include a storage chamber positioned adjacent the floor. As such, the protective enclosure is positioned inside the storage chamber and moving the protective enclosure further includes moving the protective enclosure in the stowed position at least partially out of the storage chamber to the deployed position. The storage chamber may be positioned at a front section of the trailer such that when the protective enclosure is in the deployed position and the frame is covered with one or more panels, the interior space at least partially shields the at least one drive wheel.

In one aspect of the method, the storage chamber may include a first opening located on a first side of the trailer and a first moveable door to cover the first opening when the protective enclosure is in at least the stowed position. Moving the protective enclosure further includes moving the protective enclosure through the first opening. The storage chamber may include a second opening located on a second, opposing side of the trailer, and a second moveable door to cover the second opening when the protective enclosure is in at least the stowed position. The second opening is configured to allow the protective enclosure to move therethrough between the stowed position and the deployed position.

The method may further include uncovering the frame of the one or more panels and moving the protective enclosure from the deployed position to the stowed position.

The method may further include installing tire chains onto the at least one drive wheel.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION OF THE INVENTION

Figure 1:
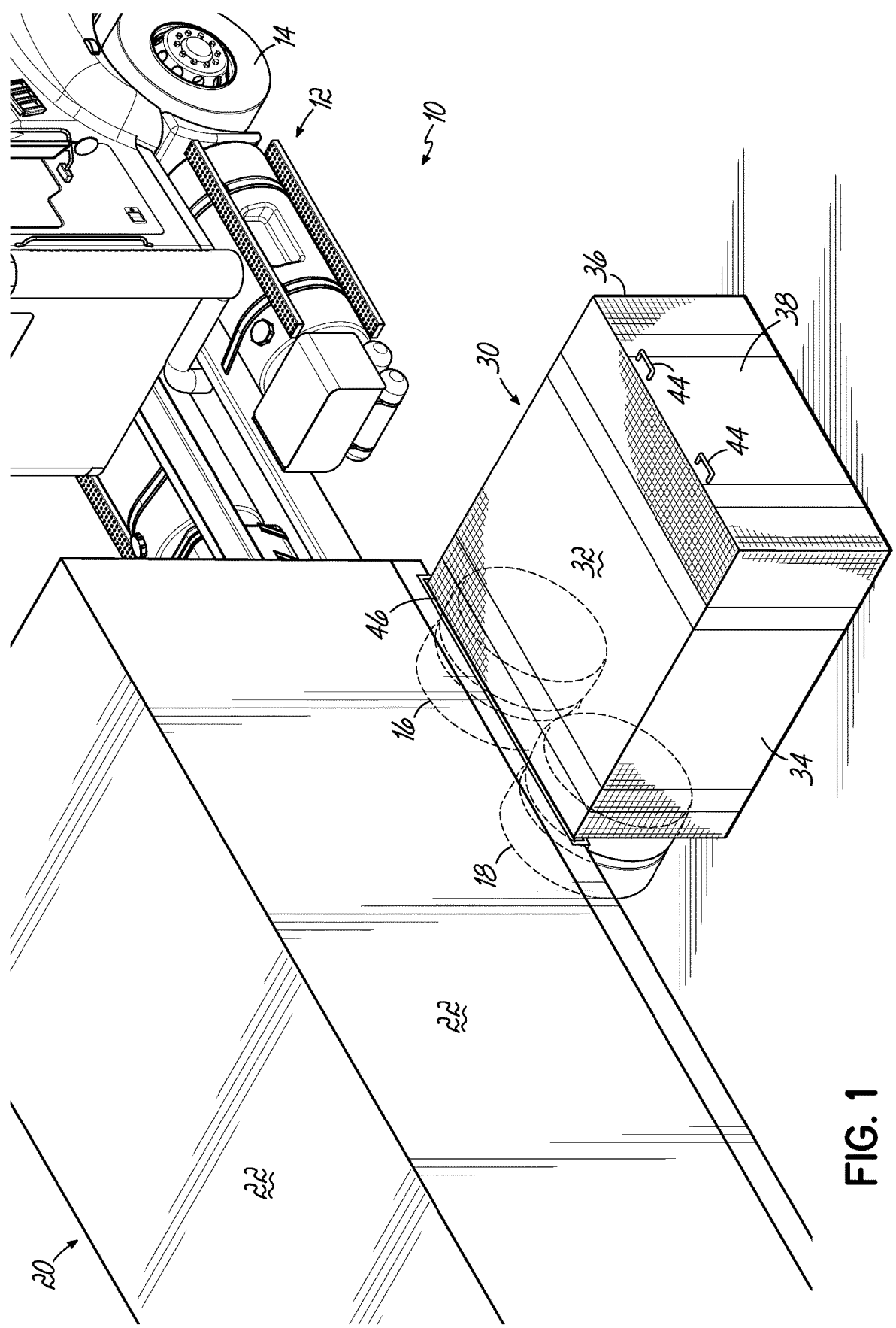
FIG. 1 is a prospective view of a semi-trailer truck with a protective enclosure in the deployed position according to an embodiment of the invention.
Figure 4:
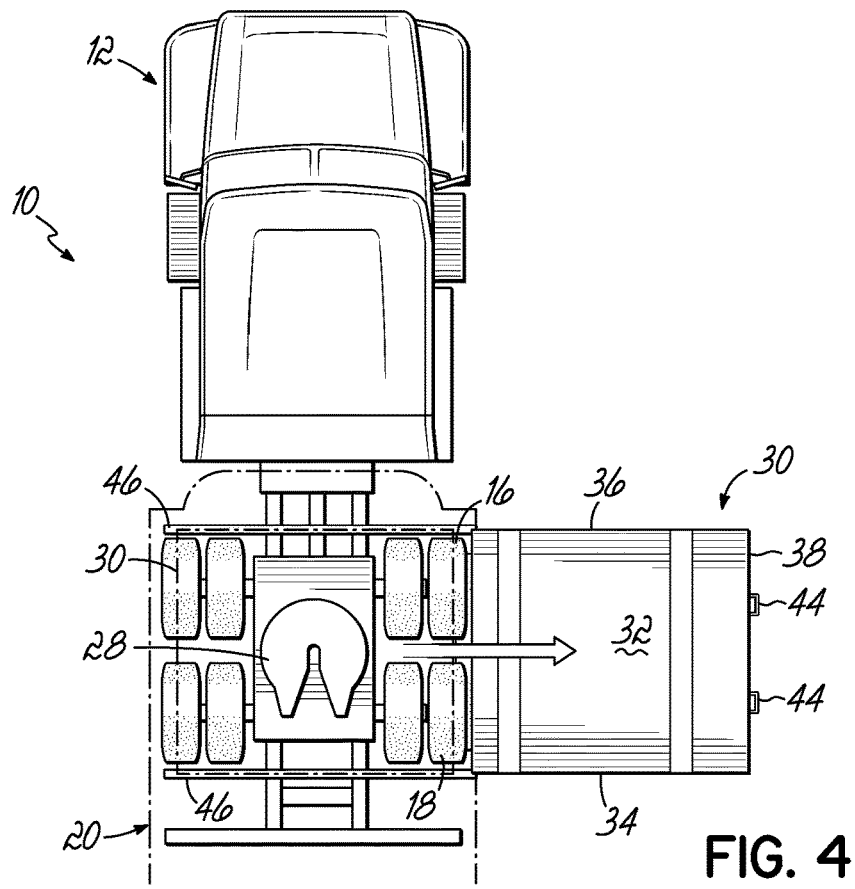
FIG. 4 is a plan view of a semi-trailer tractor and a protective enclosure according to an embodiment of the invention being moved from a stowed position to a deployed position.

A trailer-truck 10 is illustrated in FIG. 1. The trailer-truck 10 includes a truck 12 with front wheels 14 that pivot so as to steer the truck 12 in a desired direction. The truck further includes front drive wheels 16 and rear drive wheels 18. The trail-truck 10 includes a trailer that is pivotably coupled to the truck 12 via a king pin and fifth wheel 28 (FIG. 4). One such type of trailer is a semi-trailer 20 as shown in FIG. 1. The semi-trailer 20 may include walls 22 and a floor/bed 24 to form an enclosed cargo compartment 26 where cargo is carried during transit. The floor/bed 24 is configured to carry cargo during transit. Another type of trailer is a flatbed trailer (not shown) that includes a floor/bed, but no walls. While the figures and description refer to a semi-trailer 20, the concepts and principles discussed herein apply equally to a flatbed trailer.

Figure 5A:
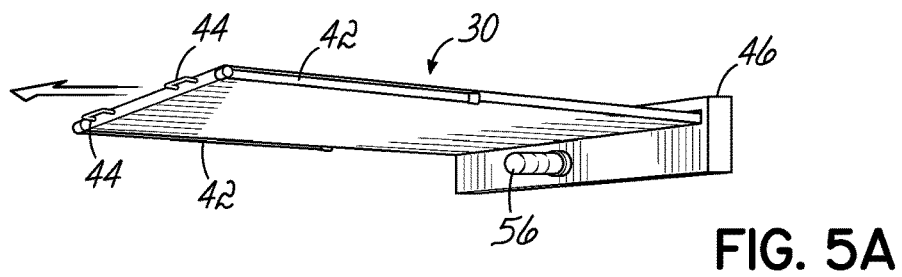
FIG. 5A is a perspective view of the protective enclosure of FIG. 4 being pulled out of a storage chamber in the semi-trailer of FIG. 4.
Figure 5B:
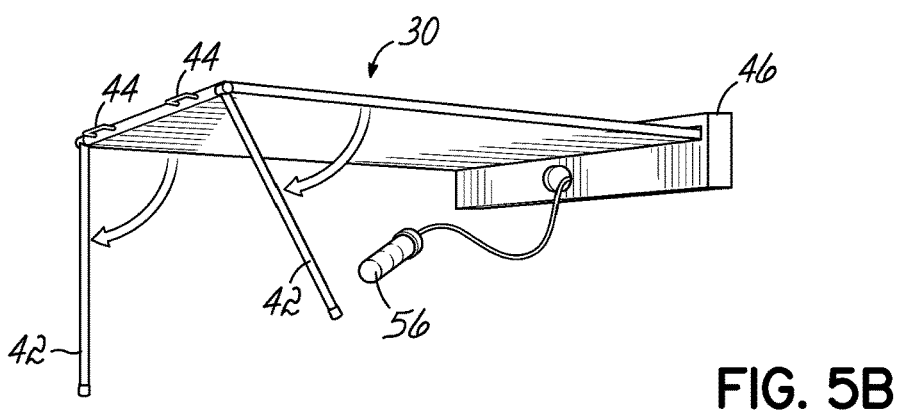
FIG. 5B is a perspective view of the protective enclosure of FIG. 4 pulled out the chamber in the semi-trailer of FIG. 4 and with the legs being swung down into position.

A protective enclosure 30 according to one embodiment of the invention is also illustrated in FIG. 1. The protective enclosure 30 includes a top panel 32, a first side panel 34 (FIG. 2), a second side panel 36, and an end panel 38. The top panel 32, the first side panel 34, the second side panel 36, and the end panel 38 may be made of any suitable, light-weight material that is water resistant or water impervious, such as treated or coated fabric, rubber, plastic, or the like. The top panel 32, the first side panel 34, the second side panel 36, and the end panel 38 may be formed from individual panels of material or they may be formed from a unitary piece of material. The protective enclosure 30 also includes a frame 40 (FIG. 2) that supports the periphery of the top panel 32. In an embodiment, the frame 40 may be rectangular or square. The frame 40 may be constructed of square or round tubing, for example. The frame 40 may be a unitary structure or composed of various components connected together, such as PVC tubing connected by couplers, for example. The protective enclosure 30 may also include a support, such as a pair of legs 42. that are pivotably connected to the frame 40 as depicted in FIG. 5B. When folded down, the legs 42 help support one end of the protective enclosure A second pair of legs (not shown) may be pivotably connected to the opposite end of the frame 40 so that when the protective enclosure 30 is used on the left side of the semi-trailer 20, the second pair of legs may support the opposite end of the frame 40.

Figure 2:
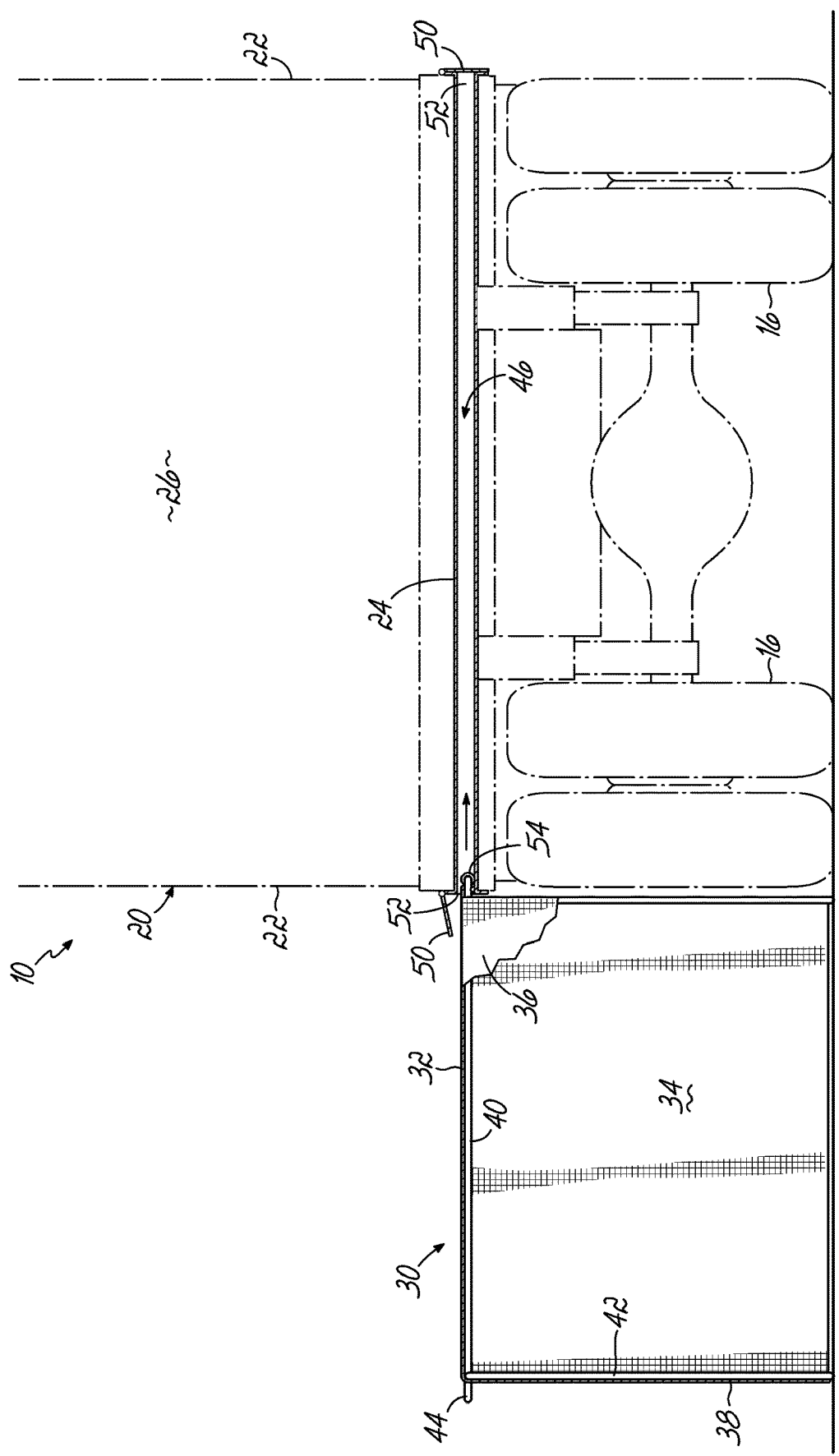
FIG. 2 is a cross-section of the semi-trailer truck of FIG. 1 with the protective enclosure in the deployed position.

The protective enclosure 30 may further include one or more handles 44 affixed to the frame 40, to the end panel 38, or the first or second side panels 36, 38. The handles 44 may be used to pull the protective enclosure 30 from a storage chamber 46. In an embodiment, the protective enclosure 30 may be positioned at a front section of the semi-trailer 20. More specifically, the protective enclosure 30 may be located below the semi-trailer 20 and above the front and rear drive wheels 16, 18. As depicted in FIG. 2, the storage chamber 46 extends across the entire width of the semi-trailer 20. As such, the protective enclosure 30 may be pulled out of either end of the storage chamber 46 so that the protective enclosure 30 may be deployed on either side of the trailer-truck 10. To that end, the handles 44 may be positioned on both sides of the protective enclosure 30. When the protective enclosure 30 is pulled out of the storage chamber 46 on the left side of the trailer-truck 10, an additional end panel (like the end panel 38 in FIG. 1) is present to form the protective enclosure 30 for the left-side drive tires. The storage chamber 46 may be integrally formed with the semi-trailer 20 and/or the cargo compartment 26. As such, the storage chamber 46 may be positioned internal to the cargo compartment 26, instead of below the semi-trailer 20.

Figure 3:
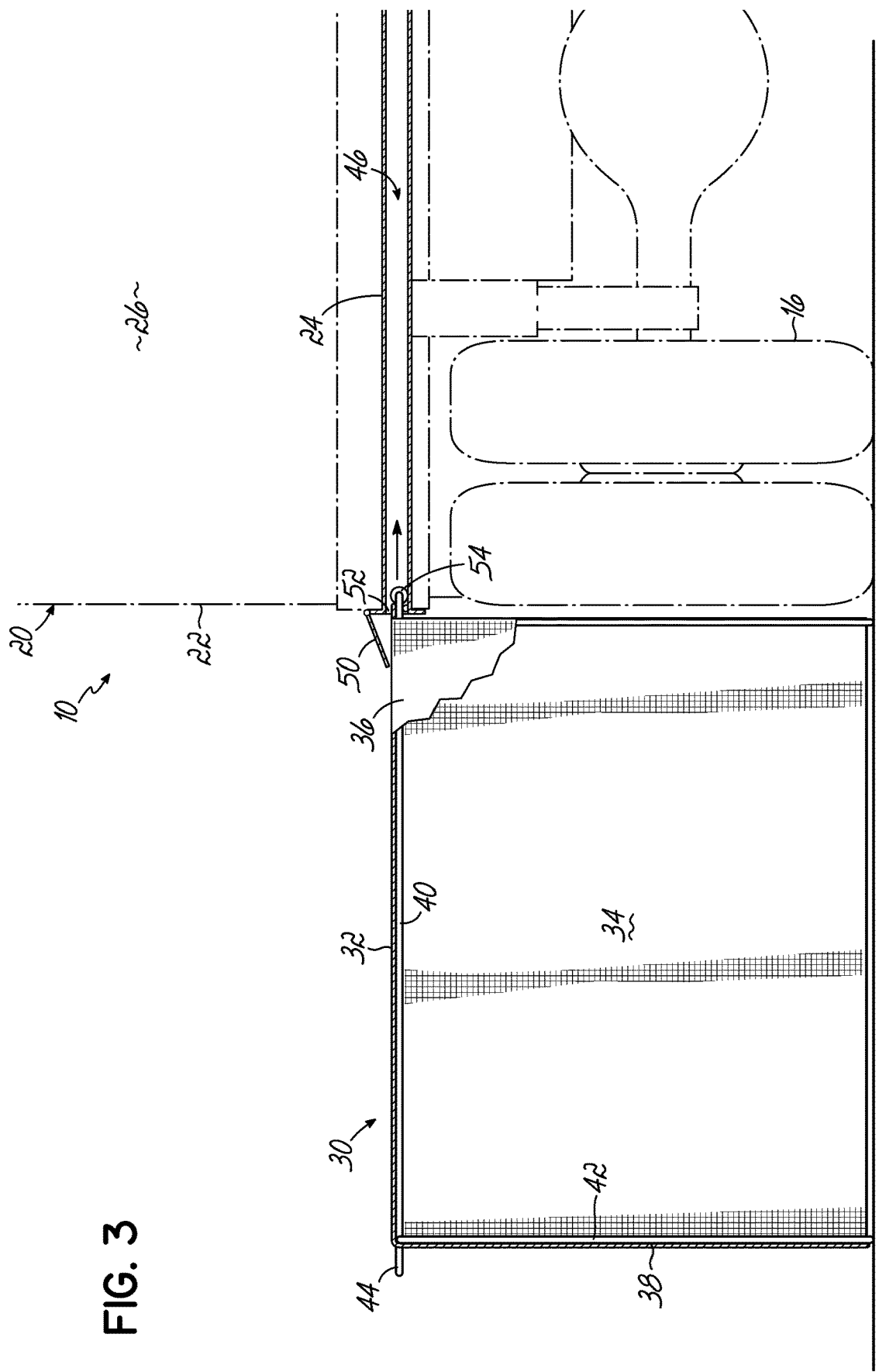
FIG. 3 is an enlarged close-up cross-section of the semi-trailer truck of FIG. 1 with the protective enclosure in the deployed position.

The protective enclosure 30 is movable between a stowed position and a deployed position. In the stowed position, the protective enclosure 30 may be generally positioned adjacent the floor 24 of the semi-trailer 20. More specifically, in the stowed position, the protective enclosure 30 may be placed fully within the confines of the storage chamber 46 as schematically illustrated in FIG. 4 by the dashed outline of the protective enclosure 30. As illustrated in FIGS. 2 and 3, the storage chamber 46 may include a door or flap 50 to cover openings 52 at either side of the storage chamber 46 when the protective enclosure 30 is in the stowed position. The flap 50 will reduce ingress of dirt, debris, water, snow, etc. into the storage chamber 46 so the protective enclosure 30 stays relatively clean. In the stowed position, the first side panel 34, the second side panel 36, and the end panel 38 may be either rolled up and secured to a respective section of frame 40 to which they are connected or they may be laid flat on top of the top panel 32. In addition, the legs 42 may be folded up so as to be generally aligned with the front and rear frame sections to which the first side and second side panels 34, 36 are attached. When the protective enclosure 30 is in the deployed position, the protective enclosure is at least partially outside the storage chamber 46 and projects away from the floor 24. In the deployed position, the top panel 32, the first side panel 34, the second side panel 36, and the end panel 38 may cooperate to form an interior space that is shielded from inclement weather, such as snow, ice, rain, and wind. As such, the task of installing tire chains on the drive wheels 16, 18 may be more readily completed in a more hospitable environment.

As illustrated in FIG. 3, the frame 40 of the protective enclosure 30 may include one or more wheels/rollers 54 to assist with moving the protective enclosure 30 from the stowed position to the deployed position. Alternatively, the storage chamber 46 may have one or more wheels/rollers to assist with moving the protective enclosure 30 between the stowed and deployed positions.

The protective enclosure 30 may include a light 56, which may illuminate the interior of the protective enclosure 30 as the tire chains are being installed on the drive wheels 16, 18. The light 56 may be of the type to also heat the interior of the protective enclosure 30. Alternatively, the protective enclosure 30 may include a separate heater to warm the interior of the protective enclosure 30.

The invention further contemplates a method of servicing the drive wheels 16, 18 of the trailer-truck 10. Servicing may include replacing a particular drive wheel or installing tire chains on the drive wheels, for example. When the trailer-truck 10 is on the road, the protective enclosure 30 is stowed inside the storage chamber 46, with the flaps 50 closing the openings 52 on either end of the storage chamber 46. Should the weather turn inclement and the roads begin to become snow and ice covered, the truck driver may decide it is prudent to attach tire chains to the front drive wheels 16 of the trailer-truck 10 to increase the traction of the front drive wheels 16. The truck driver may pull the trailer-truck 10 off the road, such as at a rest area or truck stop, to install the tire chains. When there is inclement/adverse weather in the area, the truck driver may find it more comfortable to install the tire chains with the protective enclosure 30 in the deployed position to shield the truck driver from such inclement/adverse weather. To that end, that truck driver may open the flap 50 to reveal one end of the protective enclosure 30. The truck driver may then grab the handles 44 and pull the protective enclosure 30 from its stowed position in the storage chamber 46 to a deployed position. With the frame 40 pulled out of the storage chamber 46, the truck driver may swing down the legs 42 to support one end of the protective enclosure 30. The truck driver may then cover the frame 40 with the first side panel 34, the second side panel 36, and the end panel 38 in place to create an interior space that is essentially shielded from the snow, ice, rain, hail, freezing rain, or strong wind, i.e., types of inclement weather. The adjoining vertical edges of the first side panel 34, and the second side panel 36, and the end panel 38 may be joined by fasteners, such as buttons, hooks, zippers, straps, hook and loop fasteners (Velcro™), etc. so that the interior space is further shielded. With the protective enclosure 30 in place, the truck driver may begin to install the tire chains on one side of the front drive wheels 16 with the protective enclosure 30 shielding/protecting the truck driver and at least part of the drive wheels 16 from the various forms of inclement weather. If it is dark outside, the truck driver may use the light 56 to illuminate the interior space of the protective enclosure 30.

When the truck driver finishes installing the tire chains on one side of the trailer-truck 10, the truck driver may uncover the frame 40 from the various panels 32, 34, 36, 38, fold up the legs 42, and push the protective enclosure 30 back into the storage chamber 46 and then pull it out of the other side of the semi-trailer 20 for installing the tire chains on the drive wheels 16 on the other side of the truck 12. After the truck driver finishes installing the tire chains on both sides of the front drive wheels 16, the truck driver returns the protective enclosure 30 to its stowed position inside the storage chamber 46 and closes the flaps 50. Because the protective enclosure 30 is long enough to cover both front and rear drive wheels 16, 18, the driver may choose to place tire chains on both the front and rear drive wheels 16, 18, not just on the front drive wheels 16, using the protective enclosure 30.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A trailer for use with a truck having at least one drive wheel, the trailer comprising:
   a floor configured to carry cargo; and
   a protective enclosure moveable between a stowed position and a deployed position, the protective enclosure having:
      a frame defining a periphery;
      a support for supporting an end of the frame;
      a top panel attachable to the periphery of the frame; and
      a first side panel, a second side panel, and an end panel attachable to the frame;
   wherein in the stowed position, the protective enclosure is positioned adjacent the floor, and wherein in the deployed position, the protective enclosure projects away from the floor and the top panel, the first side panel, the second side panel, and the end panel cooperate to form an interior space shielded from inclement weather.

2. The trailer of claim 1, wherein in the deployed position, the protective enclosure is positioned at a front section of the trailer such that when the truck is coupled to the trailer, the interior space at least partially shields the at least one drive wheel.

3. The trailer of claim 1, wherein the support comprises a pair of legs coupled to the frame to support the end of the frame when the protective enclosure is in the deployed position.

4. The trailer of claim 1, further comprising a storage chamber positioned adjacent the floor,
   wherein in the stowed position, the protective enclosure is positioned inside the storage chamber, and wherein in the deployed position, the protective enclosure is at least partially outside the storage chamber.

5. The trailer of claim 4, wherein the storage chamber is positioned at a front section of the trailer such that when the truck is coupled to the trailer and the protective enclosure is in the deployed position, the interior space at least partially shields the at least one drive wheel.

6. The trailer of claim 4, wherein the protective enclosure includes a handle attached to the frame to assist with moving the protective enclosure between the stowed position and the deployed position.

7. The trailer of claim 4, wherein the storage chamber includes a first opening located on a first side of the trailer, the storage chamber further including a first moveable door to cover the first opening when the protective enclosure is in at least the stowed position, and wherein the first opening is configured to allow the protective enclosure to move therethrough between the stowed position and the deployed position.

8. The trailer of claim 7, wherein the storage chamber includes a second opening located on a second, opposing side of the trailer, the storage chamber further including a second moveable door to cover the second opening when the protective enclosure is in at least the stowed position, and wherein the second opening is configured to allow the protective enclosure to move therethrough between the stowed position and the deployed position.

9. The trailer of claim 4, wherein at least one wheel is coupled to the protective enclosure to assist with moving the protective enclosure in and out of the storage chamber between stowed and deployed positions.

10. The trailer of claim 4, wherein the protective enclosure includes at least one light configured to illuminate the interior space when the protective enclosure is in the deployed position.

11. The trailer of claim 1, wherein the protective enclosure includes at least one light configured to illuminate the interior space when the protective enclosure is in the deployed position.

12. A method of servicing at least one drive wheel of a truck coupled to a trailer comprising:
    providing a truck having at least one drive wheel and a trailer coupled to the truck, the trailer having a floor configured to carry cargo, the trailer having a storage chamber positioned adjacent the floor;
    providing a protective enclosure positioned inside the storage chamber in a stowed position;
    moving the protective enclosure from the stowed position at least partially out of the storage chamber to a deployed position; and
    covering a frame of the protective enclosure with one or more panels to form an interior space at least partially shielding the at least one drive wheel.

13. The method of claim 12, wherein the protective enclosure is positioned at a front section of the trailer.

14. The method of claim 12, wherein the protective enclosure includes at least one leg coupled to the frame to support an end of the frame when the protective enclosure is in the deployed position.

15. The method of claim 12, wherein the storage chamber is positioned at a front section of the trailer such that when the protective enclosure is in the deployed position and the frame is covered with one or more panels, the interior space at least partially shields the at least one drive wheel.

16. The method of claim 12, wherein the storage chamber includes a first opening located on a first side of the trailer, the storage chamber further including a first moveable door to cover the first opening when the protective enclosure is in at least the stowed position, and wherein the step of moving the protective enclosure further includes moving the protective enclosure through the first opening.

17. The method of claim 16, wherein the storage chamber includes a second opening located on a second, opposing side of the trailer, the storage chamber further including a second moveable door to cover the second opening when the protective enclosure is in at least the stowed position, and wherein the second opening is configured to allow the protective enclosure to move therethrough between the stowed position and the deployed position.

18. The method of claim 12, further comprising:
    uncovering the frame of the one or more panels;
    moving the protective enclosure from the deployed position to the stowed position.

19. The method of claim 12, further comprising:
    installing tire chains onto the at least one drive wheel.

20. The trailer of claim 1, wherein the protective enclosure is positioned below the floor.

21. The method of claim 12, wherein the storage chamber is positioned below the floor.

* * * * *